United States Patent
Mendis et al.

(10) Patent No.: US 6,797,933 B1
(45) Date of Patent: Sep. 28, 2004

(54) ON-CHIP DESIGN-FOR-TESTING STRUCTURE FOR CMOS APS (ACTIVE PIXEL SENSOR) IMAGE SENSOR

(75) Inventors: Sunetra K. Mendis, Palo Alto, CA (US); Tzi-Hsiung Shu, San Jose, CA (US)

(73) Assignee: Vanguard International Semiconductor Corporation, Hsin-Chu (TW)

(*) Notice: Subject to any disclaimer, the term of this patent is extended or adjusted under 35 U.S.C. 154(b) by 253 days.

(21) Appl. No.: 09/896,486

(22) Filed: Jun. 29, 2001

(51) Int. Cl.[7] .............................. H01L 27/00; H04N 3/14
(52) U.S. Cl. ................................... 250/208.1; 348/308
(58) Field of Search .................... 250/208.1, 214 R, 250/214 A; 348/241, 294, 301, 302, 308, 311; 257/291, 292

(56) References Cited

U.S. PATENT DOCUMENTS

| | | | |
|---|---|---|---|
| 5,471,515 A | 11/1995 | Fossum et al. ............... 377/60 |
| 5,841,126 A | 11/1998 | Fossum et al. ........... 250/208.1 |
| 5,900,623 A | 5/1999 | Tsang et al. .............. 250/208.1 |
| 5,965,871 A | 10/1999 | Zhou et al. ............... 250/208.1 |
| 5,969,758 A | * 10/1999 | Sauer et al. ................. 348/241 |
| 5,990,506 A | 11/1999 | Fossum et al. ............. 257/294 |
| 6,201,572 B1 | * 3/2001 | Chou ......................... 348/241 |
| 6,317,154 B2 | * 11/2001 | Beiley ........................ 348/308 |

* cited by examiner

Primary Examiner—Kevin Pyo
(74) Attorney, Agent, or Firm—George O. Saile; Stephen B. Ackerman; Billy Knowles

(57) ABSTRACT

Apparatus and methods for testing an active pixel sensor ensure that a signal proportional to the quantity of light energy impinging on the active pixel sensor is reliably and accurately captured and made available for further on processing the rest of the APS system circuitry. The apparatus and method determines the capacitance of a photo-conversion device of the active pixel sensor. The apparatus and method determines that an active pixel sensor is functioning correctly. The apparatus and method determines the performance of an active pixel sensor. Where the performance of the active pixel sensor is a measure of linearity of the active pixel sensor and a connected chain of circuitry that process the signal converted by the photo-conversion device of the active pixel sensor.

1 Claim, 12 Drawing Sheets

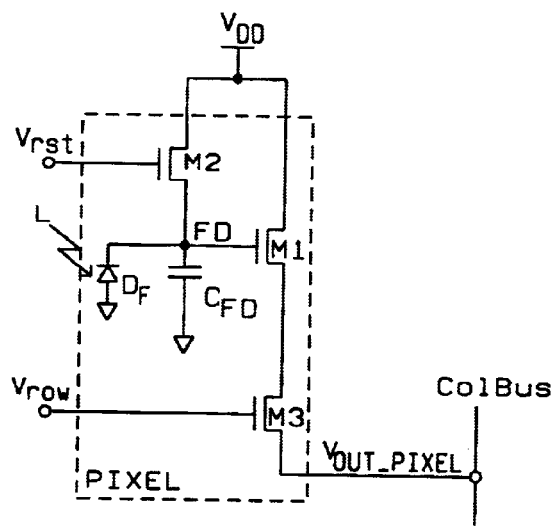
*FIG. 1 - Prior Art*
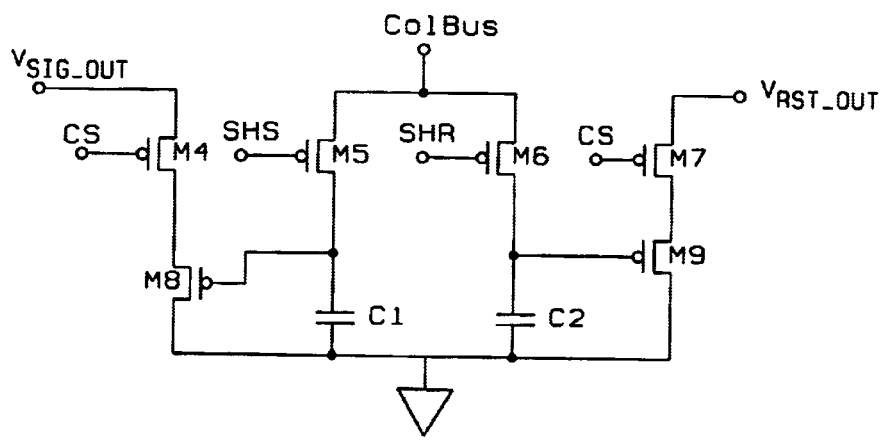
*FIG. 2 - Prior Art*

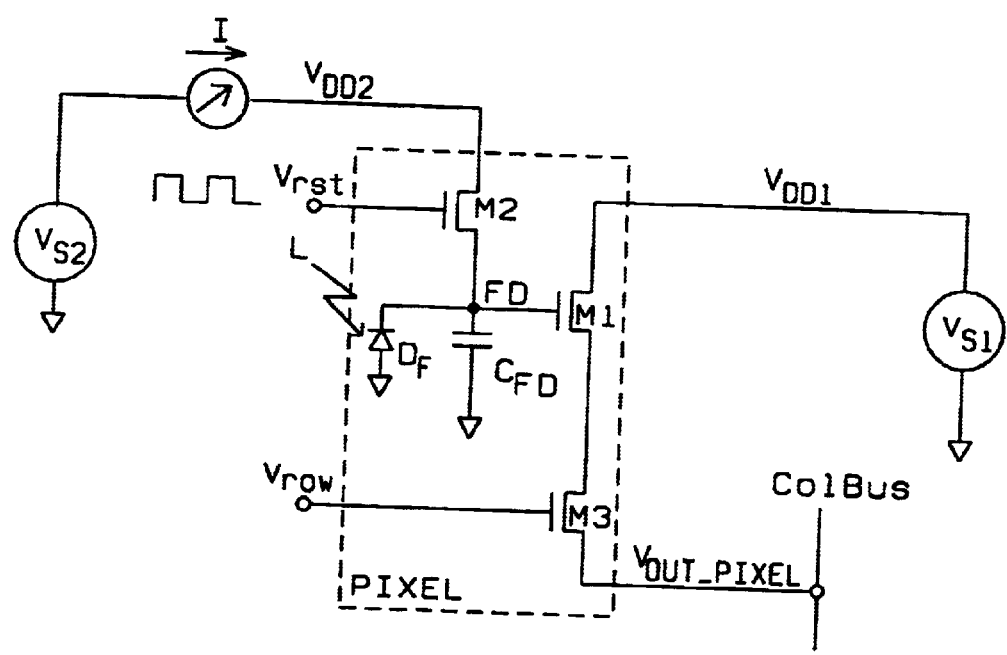
FIG. 3 – Prior Art

ON-CHIP DESIGN-FOR-TESTING STRUCTURE FOR CMOS APS (ACTIVE PIXEL SENSOR) IMAGE SENSOR

BACKGROUND OF THE INVENTION

1. Field of the Invention

This invention relates to electronic circuits and semiconductor devices that will receive light and convert the light to an electronic signal representing the amplitude of the light commonly referred to as photo-sensors or pixel sensors. More particularly this invention relates to methods and apparatus for testing light sensing devices, circuits, and blocks. This invention further identifies the use of such DFT methods and apparatus for testing of functionality and manufacturing process values to assure the operation of photosensors or pixel sensors in providing reliable and accurate electronic shuttering of captured light information as an array of pixels. This invention especially relates to methods and apparatus for testing of circuits and blocks known as active pixel sensors (APS).

2. Description of Related Art

Imaging circuits typically include a two dimensional array of photo-sensors. Each photo-sensor comprises one picture element (pixel) of the image. Light energy emitted or reflected from an object impinges upon the array of photo-sensors The light energy is converted by the photo-sensors to an electrical signal. Imaging circuitry scans the individual photo-sensors to readout the electrical signals. The electrical signals of the image is processed by external circuitry for subsequent display.

Modern metal oxide semiconductor (MOS) design and processing techniques have been developed that provide for the capture of light as charge and the transporting of that charge within APS and other structures so as to be accomplished with almost perfect efficiency and accuracy.

U.S. Pat. No. 5,841,126 (Fossum, et. al.) describes a CMOS active pixel sensor (APS) type imaging system on a chip. The imaging system consists of an APS and a controller on a single substrate. The controller provides specialized support electronics that are integrate onto the same substrate as the APS array. The controller includes integration, timing, control electronics, signal chain electronics, A/D Conversion, and other important control systems.

U.S. Pat. No. 5,900,623 (Tsang, et. al.) describes an active pixel sensor implemented with CMOS technology that employs an array of photocells. Each cell includes a photodiode to sense illumination and a separate storage node with a stored charge that is discharged during an integration period by the photocurrent generated by the photodiode. Each photocell includes a switching network that couples the photocurrent to the storage node only during the integration period while ensuring that a relatively constant voltage is maintained across the photodiode during integration and non-integration periods.

While the prior art patents describe the system, circuitry, functioning, and timing of pixel circuits and APS. None of the patents include any aspects of testing apparatus and methods for testing functionality, evaluating performance or determining capacitance of an APS.

FIG. 1 shows a typical CMOS Active Pixel Sensor (APS) of the prior art, using a photo-diode as a photo-conversion device for example. The drain terminals of the transistors M1 and M2 are connected to the power supply voltage distribution line, $V_{DD}$. The source of the transistor M2 is connected to the anode of the photo-diode $D_F$. The cathode of the photo-diode is connected to the ground reference point. The capacitance $C_{FD}$ is the inherent capacitance of the photo-diode $D_F$.

The gate of the transistor M2 is connected to a reset terminal to receive the reset signal $V_{rst}$. The sensor readout node FD, that is the anode of the photo-diode $D_F$, is first reset to a high voltage level ($V_{DD}$) by changing the reset signal $V_{rst}$ from a low voltage level (0) to a high voltage level ($V_{DD}$) to charge the capacitance $C_{FD}$. At the completion of charging the capacitance $C_{FD}$, the reset signal $V_{rst}$ is changed from the high voltage level ($V_{DD}$) to the low voltage level. Since light is shown on the photo-diode $D_F$, photo-generated electrons are collected at node FD and the voltage at the node FD decreases in the process. At the end of the exposure duration the voltage at node FD is measured, thus completing one photo-sensing cycle. The photo-sensing cycle is completed by deactivating the transistor M3 by changing the row select signal from the high voltage level ($V_{DD}$) to the low voltage level (0).

The gate of the transistor M1 is connected to the node FD and the source of the transistor M1 is connected to the drain of the transistor M3. The transistor M1 acts as a source follower such that the voltage present at the source of the transistor M1 "follows" directly the voltage present at the gate of the transistor M1 and is one transistor threshold voltage $V_T$ below the voltage present at the gate of the transistor M1.

The gate of the transistor M3 is connected to the row select line to receive the row select signal $V_{row}$. The source of the transistor M3 is connected to the column bus ColBus. The column bus interconnects all the APS's present on a column of an array of APS's. When the row select signal changes from a low voltage level (0V) to a high level ($V_{DD}$), the transistor $M_3$ turns-on and the voltage present at the source of the transistor $M_1$ is transferred to the output of the APS to couple the voltage that is proportional to the intensity of the light L. The output signal $V_{out\_pixel}$ of the APS is coupled to the column bus ColBus for further conditioning and readout.

An APS signal conditioning and readout circuit as shown in FIG. 2 and described in Fossum, et. al. is connected to the column bus ColBus of each column of APS's of an array of APS's. The APS signal and readout circuit employs correlated double sampling (CDS) to determine the level of the light L impinged upon the photodiode $D_F$. Correlated double sampling (CDS) is achieved by sampling both a reset reference level and a signal level. The difference between the signal level and the reset reference level represents the net signal induced by level of the light L illuminating the photodiode $D_F$. The resulting voltage of the node FD is read out through the transistors M1 and M3 of the APS pixel circuit of FIG. 1 onto the column bus ColBus. The voltage $V_{out\_pixel}$ on the column bus ColBus is sampled onto a first holding capacitor C1 by an activation pulse SHR to the gate of the transistor M6. This initial charge is used as the baseline. After raising the reset signal $V_{rst}$, the signal charges within the APS pixel circuit due to the impinging of photoelectrons and the capacitance $C_{FD}$. The resulting voltage $V_{out\_pixel}$ is also transferred onto the column bus ColBus and sampled onto a second holding capacitor C2 by an activation pulse SHS to the gate of the transistor M5. The difference between the voltages on the first capacitor C1 and the second capacitor C2 is therefore indicative of the number of photoelectrons of the light L that were allowed to enter the photodiode $D_F$.

A key element in the calculation of the conversion gain in a CMOS APS imager pixel is the measurement of the capacitance $C_{FD}$ at the pixel readout node, FD.

In the prior art, a conventional APS test scheme used to measure the capacitance is shown in FIG. 3. To summarize how such an APS test approach is used, a photo-diode pixel of FIG. 1 is used as an example.

The structure of FIG. 1 is modified such that the drain connections of the transistors M1 and M2 are separately connected. The drain of M1 is now connected to the supply line, $V_{DD}1$, while the drain of M2 is connected to another supply line, $V_{DD}2$.

The voltage source VS1 driving the supply line $V_{DD}1$ is set to a voltage level of the power supply voltage source $V_{DD}$. A second voltage source connected to the $V_{DD}2$ line is also set to the same value, the power supply voltage source $V_{DD}$. Bright light is shown on the pixel so that it is saturated. The reset signal $V_{rst}$ is pulsed periodically and the resulting average current from the voltage source is measured. The equation relating the measured average current I and the capacitance $C_{FD}$ on the node FD of the photo-diode $D_F$ is calculated by the formula:

$$I = dQ/dt = Q_{FD} * dV/dt \qquad \text{Eq. 1}$$

where:

dt is the period of the reset signal $V_{rst}$ dV is the voltage difference between reset level and saturation level.

The capacitance is therefore:

$$C_{FD} = \frac{I}{\frac{dV}{dt}} \qquad \text{Eq. 2}$$

Although the electrical design of the APS pixel test approach shown in FIG. 2 is similar to the one shown in FIG. 1, the physical layout of the two pixels are quite different. In a normal pixel design, in order to increase the density of the pixels per unit area of the APS's and to reduce the complexity of signal routing, the drains of M1 and M2 are connected together to the same supply, $V_{DD}$, through a single metal line.

However in the APS cell test approach of the prior art, since the drain connections of transistors M1 and M2 in FIG. 3 need to be separated in order to facilitate the above test measurement, two metal lines are needed to route the two drain connections. As a result, the pixel design is less area efficient than a design that includes no special test circuitry.

In the design approach for imaging products using arrays of APS cells, in actual application, it is preferred that the more efficient pixel in FIG. 1 is used. In order to measure the conversion gain of the pixel design implemented using a particular semiconductor manufacturing process, an additional row of the pixel cells implemented using an approach such as shown in FIG. 3 needs to be added to the normal APS pixel array.

In addition, in a conventional APS array embodiment, the additional row of testable APS pixels cannot be covered up by light shielding material to form part of the "dark pixels" normally placed around the active pixels since they must operate under bright light for the measurement

SUMMARY OF THE INVENTION

It is an objective of this invention is to provide an apparatus for testing an active pixel sensor to ensure that a signal proportional to the quantity of light energy impinging on the active pixel sensor is reliably and accurately captured and made available for further on processing the rest of the APS system circuitry.

It is another objective of this invention is to provide a method and apparatus for determining the capacitance of a photo-conversion device of the active pixel sensor.

Further, it is an object of this invention to provide a method and apparatus for determining that an active pixel sensor is functioning correctly.

Still further, is it as an object of this invention to provide a method and apparatus for determining the performance of an active pixel sensor. Where the performance of the active pixel sensor is a measure of linearity of the active pixel sensor and a connected chain of circuitry that process the signal converted by the photo-conversion device of the active pixel sensor.

To accomplish these and other objectives, an apparatus for testing functionality, evaluating performance and measuring capacitance of a photo-conversion device of at least one active pixel sensor of an array of active pixel sensors has a test voltage selection circuit. The test voltage selection circuit selectively applies any of a plurality of voltage levels that vary incrementally from a first voltage level to a second voltage level to a reference distribution node of the active pixel sensors. The apparatus further has a timing control circuit. The timing control circuit is connected to the test voltage circuit and to the array of active pixel sensors, and to a signal conditioning and readout circuit to provide signals to select timings to select application of the first voltage level and the second voltage level to the reference distribution node of the active pixel sensors, signals at appropriate timings to condition the active pixel sensors in preparation for sensing light impinging upon the array of active pixel sensors, and providing signals for timing the signal conditioning and readout circuit to sense a signal from each active pixel sensor indicating a magnitude of light impinging upon the array of active pixel sensors.

A first embodiment of the test voltage selection circuit includes a first switch. The first switch has a first terminal connected to a first voltage source that provides the first voltage level, a second terminal connected to the reference distribution node of at least one active pixel sensor on a row of active pixel sensors, and a control terminal connected to the controlling circuit to selectively connect and disconnect the first terminal with the second terminal. The test voltage selection circuit has a second switch. The second switch has a first terminal connected to a second voltage source that provides the second voltage level, a second terminal connected to the reference distribution node of at least one active pixel sensor on the row of active pixel sensors in the array of active pixel sensors, and a control terminal connected to the controlling circuit to selectively connect and disconnect the first terminal with the second terminal. The test voltage selection circuit has a current measuring device connected so as to measure a current flowing from the first voltage source.

The timing control circuit enables measurement of the capacitance of the photo-conversion device within one active pixel sensor by selecting the active pixel sensor at a first time. At a second time, the second voltage level is placed at the reference distribution node of the active pixel sensor and simultaneously, at the second time, the second voltage level is coupled to the photo-conversion device. Subsequent to applying the second voltage level to the photo-conversion device, the first voltage level is applied to the reference distribution node at a third time. Simultaneously, at the third time, the first voltage level is coupled to the photo-conversion device. The current flowing to the photo-conversion device to charge the capacitance of the photo-conversion device from the first voltage level to the second voltage level is measured. The capacitance of the photo-conversion device is determined by the formula:

$$C_{FD} = \frac{I}{\frac{dV}{dt}}$$

where
  $C_{FD}$ is the total capacitance of the photo-conversion devices and the parasitic capacitance of the test voltage select circuit,
  I is the current flowing from the first voltage source,
  dv is the difference between the first voltage level and the second voltage level, and
  dt is a charging time for the capacitance;

The timing control circuit enables testing functionality of a row of the active pixel sensors within the array of active pixel sensors and the chain of circuitry connecting the selected row of active pixel sensors selecting the row of active pixel sensors at a first time. At a second time, one of the plurality of voltage levels is placed on each reference distribution node of each active pixel sensor. The magnitude of the voltage level placed on each reference distribution node is indicative of a position on the row of active pixel sensors of each active pixel sensor. Simultaneously, at the second time, the voltage level of the plurality of voltage levels is coupled to the photo-conversion device to charge the capacitance of the photo-conversion device to the voltage level. The voltage level of the capacitance of each active pixel sensor on the selected row of active pixel sensors sampled and held the within the signal conditioning and readout circuit at a third time. The first voltage level is placed at the reference distribution node of each active pixel sensor on the row of active pixel sensors at a fourth time. Simultaneously, at the fourth time, the first voltage level is coupled to the capacitance of the photo-conversion device of each active pixel sensor of the row of active pixel sensors. At a fifth time, the first voltage level sampled and held on the capacitance of the photo-conversion device of each active pixel sensor on the selected row of active pixel sensors within the signal conditioning and readout circuit. The sampled and held voltage level of the plurality of voltage levels and the sampled and held first voltage level of each active pixel sensor of the selected row of active pixel sensors are then transferred to an output port of the signal conditioning and readout circuit for transfer to external circuitry. The external circuitry differentially compares the sampled and held voltage level of the plurality of voltage levels with the sampled and held first voltage level and the functionality of each active pixel sensor on the selected row of active pixel sensors, and the chain of circuitry connected to each active pixel sensor of the row of active pixel sensors is determined as a function of a difference between the sampled and held voltage level of the plurality of voltage levels and the sampled and held first voltage level.

The timing and control circuit enables evaluating performance of at least one active pixel sensor and the chain of circuitry connected to the active pixel sensor by selecting the active pixel sensor at a first time. At a second time, the second voltage level is placed at the reference distribution node of the active pixel sensor. Simultaneously, at the second time, the second voltage level is coupled to the capacitance of the photo-conversion device. The second voltage level sampled and held the within the signal conditioning and readout circuit at a third time. At a fourth time, the first voltage level is placed at the reference distribution node of the active pixel sensor and simultaneously, the first voltage level is coupled to the capacitance of the photo-conversion device at the fourth time. At a fifth time, the first voltage level from the capacitance of the photo-conversion device of the active pixel sensor sampled and held to the signal conditioning and readout circuit. The sampled and held first voltage level and the sampled and held second voltage level is transferred to an output of the signal conditioning and readout circuit for transfer to external circuitry. The external circuitry differentially compares the sampled and held first voltage level and the sampled and held second voltage level such that the difference of the sampled and held first voltage level and the sampled and held second voltage level determines performance of the active pixel sensor.

In a second embodiment the test voltage selection circuit has a first voltage distribution line containing a first distribution voltage level and a second voltage distribution line containing a second distribution voltage level. The test voltage selection circuit has a first switch. The first switch has a first terminal connected to a first voltage source that provides the first voltage level, a second terminal connected to the first voltage distribution line, a third terminal connected to the second voltage distribution line, and a control terminal connected to the timing and control circuit to selectively connect the first terminal to the second and third terminals concurrently. The test voltage selection circuit further has a second switch. The second switch has a first terminal connected to a second voltage source that provides the second voltage level, a second terminal connected to the first voltage distribution line, a third terminal connected to the second voltage distribution line, and a control terminal connected to the timing and control circuit to selectively connect the first terminal to the second and third terminals concurrently. The test voltage selection circuit has a third switch. The third switch has a first terminal connected to the first voltage source, a second terminal connected to the second voltage source, a third terminal connected to the first voltage distribution line, a fourth terminal connected to the second voltage distribution line, and a control terminal connected to the timing and control circuit to selectively connect the first terminal to the third terminal and concurrently connect the second terminal to the fourth terminal. Additionally, the test voltage selection circuit has a voltage divider. The voltage divider is connected between the first voltage distribution line, and connected to the reference distribution node of each active pixel sensor on a row of active pixel sensors for the array of active pixel sensors for distributing an incremental voltage level that varies fractionally from the first distributed voltage level present at the first voltage distribution line to the second distributed voltage level present at the second voltage distribution line. The test voltage selection circuit includes a current measuring device connected so as to measure current flowing from the first voltage source.

In the second embodiment of the test voltage selection circuit the timing and control circuit enables measurement of the average capacitance of the photo-conversion device within a group of active pixel sensors of the array of active pixel sensors by selecting the group of active pixel sensors, at a first time. During a period of time between a second time and a third time, the second switch is activated to connect the first terminal of the second switch to the second terminal and third terminal of the second switch to apply the second voltage level to the first and second voltage distribution lines and thus to the reference distribution node of each active pixel sensor of the group of active pixel sensors.

Simultaneously, during the period between the second time and the third time, the second voltage level is coupled to the capacitance of the photo-conversion device of each active pixel sensor of the group of active pixel sensors to charge the capacitance to the second voltage level. During a period of time between a fourth time and a fifth time, the first switch is activated to connect the first terminal of the first switch concurrently to the second and third terminals of the first switch to apply the first voltage level to the first and second voltage distribution lines and thus to the reference distribution node of each active pixel sensor of the group of active pixel sensors. Simultaneously, during the period between the fourth and fifth time, the first voltage level is coupled to the capacitance of the photo-conversion device of each active pixel sensor of the group of active pixel sensors to charge the capacitance of the photo-conversion device to the first voltage level. The current flowing from the first voltage source to charge the capacitance of the photo-conversion device of each active pixel sensor of the group of active pixel sensors is then measured. The total capacitance of the photo-conversion devices of the group of active pixel sensors and a parasitic capacitance of the test voltage select circuit is determined by the formula:

$$C_T = \frac{I_T}{\frac{dV}{dt_{CT}}}$$

where $C_T$ is the total capacitance of the photo-conversion devices and the parasitic capacitance of the test voltage select circuit, $I_T$ is the current flowing from the first voltage source, dv is the difference between the first voltage level and the second voltage level, and $dt_{CT}$ is a charging time for the total capacitance;

The parasitic capacitance is now measured by activating the second switch to connect the first terminal of the second switch to connect the second terminal and third terminal of the second switch to apply the second voltage level to the first and second voltage distribution lines and thus to the reference distribution node of each active pixel sensor of the group of active pixel sensors, during a period of time between a sixth time and a seventh time. The first switch is then activated to connect the first terminal of the first switch concurrently to the second and third terminals of the first switch to apply the first voltage level to the first and second voltage distribution lines and thus to the reference distribution node of each active pixel sensor of the group of active pixel sensors, during a period of time between an eighth time and a ninth time. The current flowing from the first voltage source to charge the parasitic capacitance of the test voltage select circuit is then measured. The parasitic capacitance of the test voltage select circuit is determined by the formula:

$$C_P = \frac{I_P}{\frac{dV}{dt_{CP}}}$$

where $C_P$ is the parasitic capacitance of the test voltage select circuit, $I_P$ is the current flowing to the parasitic capacitance $C_P$ during charging from the second voltage level to the first voltage level, dv is a difference between the first voltage level and the second voltage level, and $dt_{CP}$ is a charging time for the parasitic capacitance, The average capacitance of the photo-conversion device of each of the active pixel sensors of the group of active pixel sensors is determined by the formula:

$$\overline{C_{FD}} = \frac{C_T - C_P}{n}$$

where $\overline{C_{FD}}$ is the average capacitance of the photodiode, $C_T$ is the total capacitance, $C_P$ is the parasitic capacitance, and n is a number of active pixel sensors of the group of active pixel sensors.

The second embodiment of the timing and control circuit enables testing functionality of a group of at least one active pixel sensor by, at a first time, selecting the group of active pixel sensors. During a period of time between a second time and a third time, the third switch is activated to apply the first voltage level to the first voltage distribution line and to apply the second voltage level to the second voltage distribution line such that one of the incremental voltage levels is applied to the reference distribution node of each active pixel sensor of the group of active pixel sensors. Simultaneously, during the period between the second and third time, the incremental voltage level is coupled to the capacitance of the photo-conversion device of each active pixel sensor to the row of active is pixel sensors to charge the capacitance of the photo-conversion device to the incremental voltage level. The incremental voltage level present on the capacitance of the photo-conversion device of each of the active pixel sensors of the group of active pixel sensors is sampled and held within the signal conditioning and readout circuit, during a period of time between a fourth time and a fifth time. The first switch is activated to apply the first voltage level to the first voltage distribution line and the second voltage distribution line to place the first voltage level at the reference distribution node of each active pixel sensor of the group of active pixel sensors during a period of time between a sixth time and a seventh time. Simultaneously, during the period of time between the sixth time and the seventh time, the first voltage level is coupled from the reference distribution node to the capacitance of the photo-conversion device of each active pixel sensor of the group of active pixel sensors to charge the capacitance of the photo-conversion device from the incremental voltage level to the first voltage level. The first voltage level present on the capacitance of the photo-conversion device of each active pixel sensor of the group of active pixel sensors is sampled and held within the signal conditioning and readout circuit during a period of time between an eighth time and a ninth time. The sampled and held incremental voltage level present of the capacitance of the photo-conversion device of each of the active pixel sensors of the group of active pixel sensors and the sampled and held first voltage level of each of the active pixel sensors of the group of active pixel sensors are placed at an output port of the signal conditioning and readout circuit for transfer to external circuitry. The external circuitry differentially compares the sampled and held increment voltage level and the first voltage level, thus determining the functionality of each active pixel sensor of the group of active pixel sensors, and the chain of circuitry connected to each active pixel sensor of the group of active pixel sensors is determined as a function of a difference between the sampled and held incremental voltage level and the sampled and held first voltage level.

The timing and control circuit enables evaluating performance of a group of at least one active pixel sensor of the array of active pixel sensors by at a first time, selecting the group of active pixel sensors. Then during a period of time between a second time and a third time, the second switch is activated to apply the second voltage level to the voltage distribution line such that the second voltage level is applied to the reference distribution node of each active pixel sensor of the group of active pixel sensors. Simultaneously, during the period of time between the second and third time, the second voltage level is coupled to the capacitance of the photo-conversion device of each active pixel sensor to the it i row of active pixel sensors to charge the capacitance of the photo-conversion device to the second voltage level. The second voltage level present on the capacitance of the photo-conversion device of each of the active pixel sensors of the group of active pixel sensors is sampled and held within the signal conditioning and readout circuit during a period of time between a fourth time and a fifth time. During a period of time between a sixth time and a seventh time, the first switch is activated to apply the first voltage level to the first voltage distribution line and the second voltage distribution line to place the first voltage level at the reference distribution node of each active pixel sensor of the group of active pixel sensors. Simultaneously, during the period of time between the sixth time and the seventh time, the first voltage level is coupled from the reference distribution node to the capacitance of the photo-conversion device of each active pixel sensor of the group of active pixel sensors to charge the capacitance of the photo-conversion device from the incremental voltage level to the first voltage level. The first voltage level present on the capacitance of each active pixel sensor of the group of active pixel sensors is sampled and held within the signal conditioning and readout circuit during a period of time between an eighth time and a ninth time. The sampled and held second voltage level present on the capacitance of the photo-conversion device of each of the active pixel sensors of the group of active pixel sensors and the sampled and held first voltage level of each of the active pixel sensors of the group of active pixel sensors are placed at an output port of the signal conditioning and readout circuit for transfer to external circuitry. The external circuitry differentially compares the sampled and held second voltage level and the first voltage level, thus determining performance of each active pixel sensor of the group of active pixel sensors and of the chain of circuitry connected to each active pixel sensor of the group of active pixel sensors is determined as a function of a difference between the sampled and held incremental voltage level and the sampled and held first voltage level.

The group of active pixel sensors being tested for functionality, evaluated for performance and having its capacitance measured is usually a row of an array of active pixel sensors. The group of active pixel sensors can be a row of active pixel sensors placed in an area of dark pixels of the array of active pixel sensors at an edge of the array of active pixel sensors.

The evaluating performance of each active pixel sensor of the group of active pixel sensors includes evaluating range and linearity of each active pixel sensor and the chain of circuitry connected to active pixel sensor.

BRIEF DESCRIPTION OF THE DRAWINGS

FIG. 1. is a schematic of an active pixel sensor of the prior art.

FIG. 2. is a schematic of an active pixel sensor output signal conditioning and readout circuit of the prior art.

FIG. 3. is a schematic of a structure of an active pixel sensor to measure the capacitance of the photo-diode of an active pixel sensor of the prior art.

DETAILED DESCRIPTION OF THE INVENTION

Figure 4:
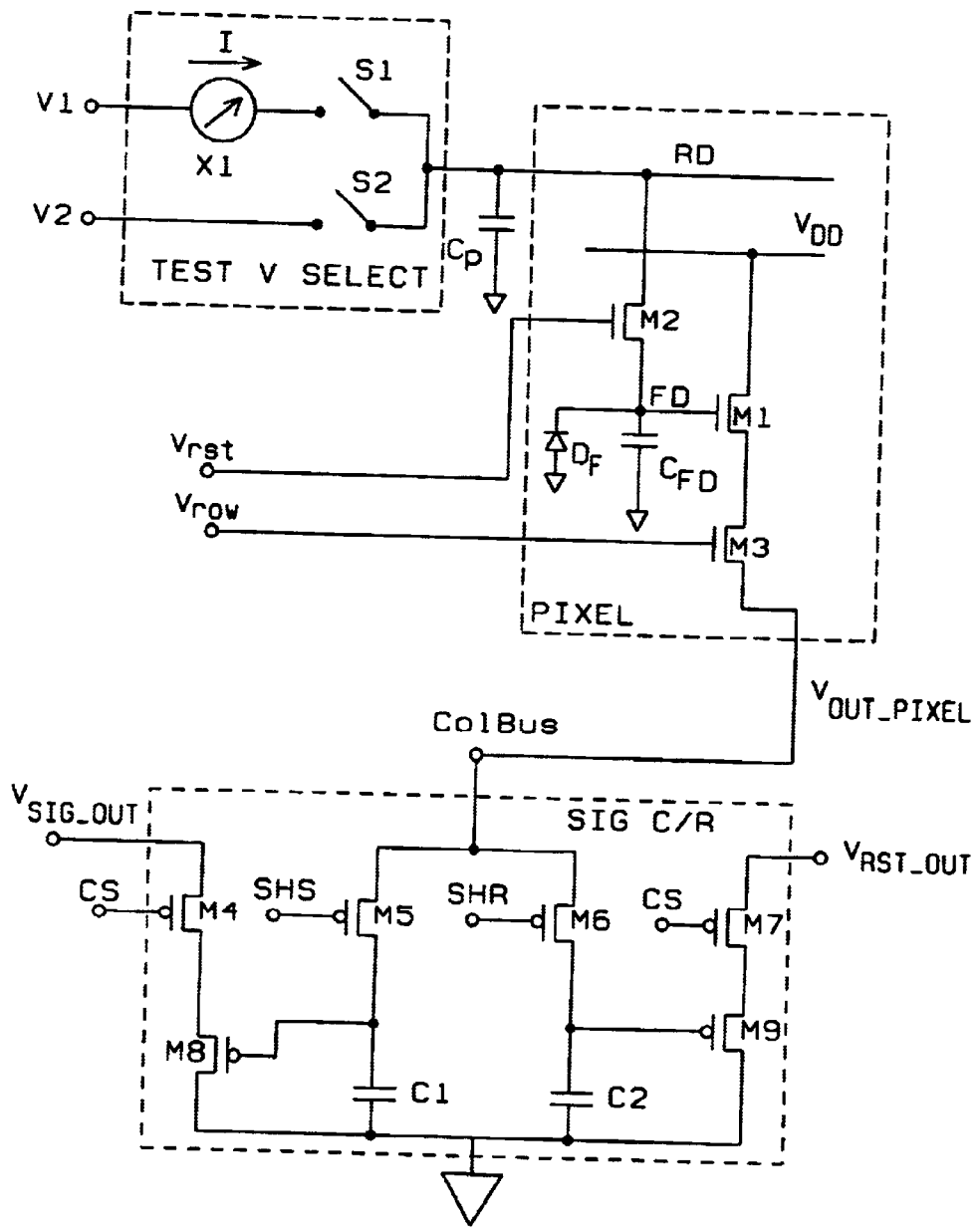
FIG. 4. is a schematic of a test system for an active pixel sensor of this invention.

The new Design-for-Test (DFT) structure of the present invention is shown in FIG. 4. The drains of the transistors M1 and M2 are connected respectively to the power supply distribution line $V_{DD}$ and the reference voltage distribution line RD, respectively. The power supply distribution line $V_{DD}$ is driven by a fixed voltage source set at a value equal to the power supply voltage level $V_{DD}$ required by the target semiconductor manufacturing process. However, instead of connecting to the same fixed voltage of $V_{DD}$ as described above, the RD node is switched between two external voltage levels, V1 and V2, through the switches S1 and S2 which are implemented as CMOS switches. The clock signals controlling the activation of the switches S1 and S2 should be non-overlapping to prevent excess current flowing between the voltage sources supplying the voltage levels, V1 and V2.

By holding the reset signal $V_{rst}$ high at the power supply voltage level $V_{DD}$, the transistor M2 is fully turned on. By switching the between V1 and V2, where V1>V2, the current I drawn from the voltage source V1 can be measured by the current measuring device X1 in this test step.

Alternately, as another test approach, the reset signal $V_{rst}$ can be pulsed first to reset the FD node voltage through S1 to the node voltage level of V1, then pulsed again to discharge the FD node through S2 to V2. Since the node FD is discharged and then discharged to V1 and V2 through the switching sequence, there is no need to test this embodiment of an APS cell using a light source.

The effective capacitance in the area of the photosensitive element may then be calculated, which includes both the interconnect parasitic capacitance of the circuitry in the area of the RD node and the capacitance $C_{FD}$ of the photo-diode $D_F$. The effective capacitance is:

$$C_T = C_P + C_{FD}$$

where $C_T$ is the total capacitance of the test voltage select circuit and the capacitance of the node FD.

$C_P$ is the parasitic capacitance of the test voltage select circuit.

$C_{FD}$ is the capacitance of the node FD of a pixel.

It is well-known in the art that the total capacitance is determined by the equation $$C_T = \frac{I_T}{\frac{dV}{dt}}$$

where:

I is the current measured by the current measuring device X1 of.

dv is the difference between the voltage level V1 and the voltage level V2.

dt is the period required for the capacitance $C_T$ to charge.

and the parasitic capacitance is determined by the equation:

$$C_P = \frac{I_P}{\frac{dV}{dt}}$$

where:

$I_P$ is the current measured by the current measuring device X1.

dv is the difference between the voltage level V1 and the voltage level V2.

dt is the period required for the capacitance $C_P$ to charge.

The net capacitance at the APS floating diffusion of the photosensitive element is therefore:

$$C_{FD} = C_T - C_P$$

As a result with the present invention's testable APS pixel circuit and above test steps, the net capacitance $C_{FD}$ of the photo conversion device $D_F$ can be tested and calculated without the need for an external light source.

The testable APS pixel circuit of this invention can also be incorporated with an embodiment of supporting design-for-test (DFT) structures to verify key properties of the functionality of the associated APS pixel's signal conditioning readout circuitry Sig C/R. With proper of timing of switch control signals for S1 and S2, a known voltage can be established on the floating diffusion node FD just before the pixel readout operation. This known voltage undergoes the full readout operation and the corresponding output can be compared with the expected output. Any deviation of the measured output from the expected output indicates non-ideal effects along the complete readout chain. Thus the functionality such as range and linearity of the complete signal conditioning and readout chain can be verified.

The operational mode for the testable APS cell of this invention is activated by closing switch S1 to connect the voltage level V1 to the read distribution line RD. During the normal operation, the voltage level V1 is set to the level of the power supply voltage source $V_{DD}$. The testable APS pixel cell is reset by turning on the transistor M2 bringing the reset line $V_{rst}$ to a high level. The capacitance $C_{FD}$ is charged to the voltage level V1 which turns on the transistor M1. The row select signal $V_{row}$ is then activated and the reference level of the node FD is sampled by the signal conditioning and readout circuit Sig C/R as described above. The reset signal line $V_{rst}$ disables the transistor M2. The light exposes the photodiode $D_F$ and as described above, electrons are collected at the node FD. After an integration time, the signal conditioning and readout circuit Sig C/R senses the collected charge of the node FD, conditions the signals and provides the readout as also described above.

Figure 5:
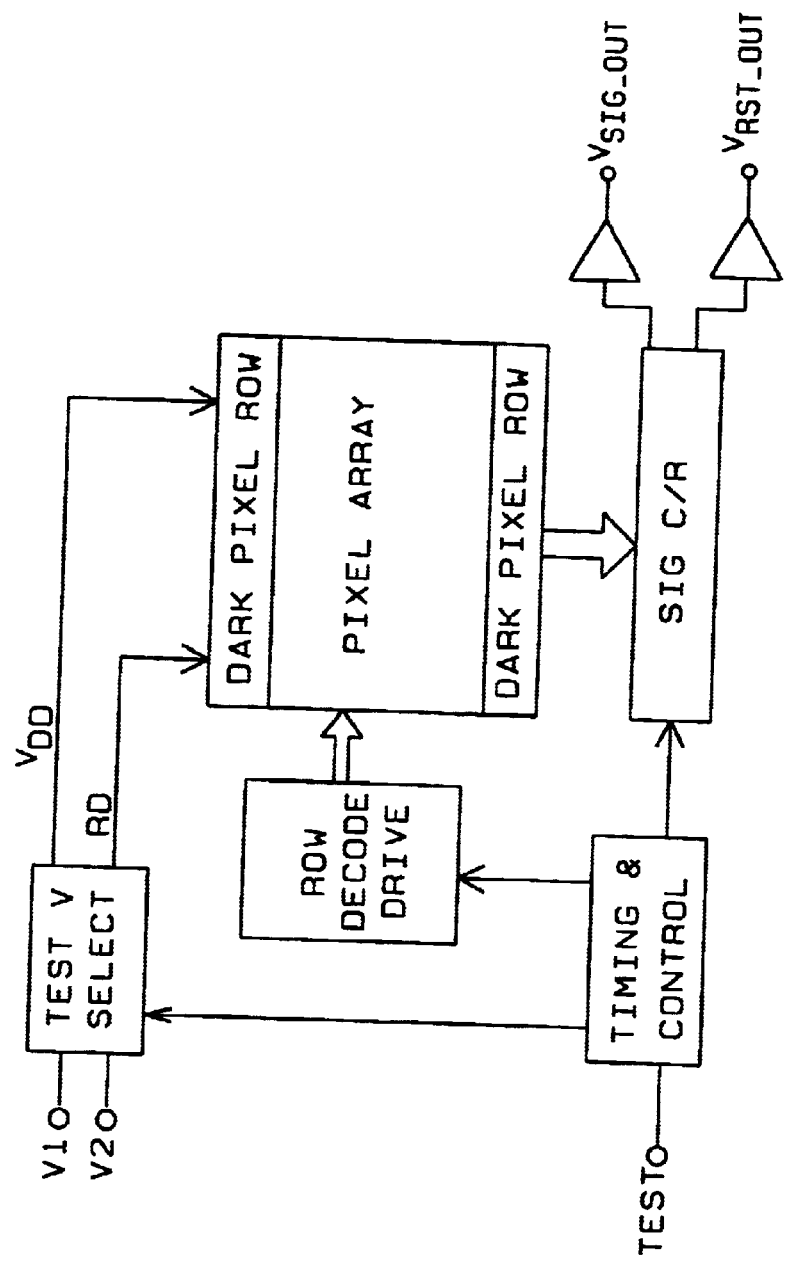
FIG. 5. is a schematic of an array of testable active pixel sensor cells of this invention.

A preferred embodiment of this functionally-testable APS pixel cell circuit invention is shown in FIG. 5 as a testable APS array subsystem. The pixel array is formed of rows and columns of interconnected testable APS cells of this invention as shown in FIG. 4. The row decode driver circuit provides, at the appropriate time, the row select signal $V_{row}$ to one row of the pixel array. Each column of the testable APS cells in the pixel array is connected to a signal conditioning and readout circuit Sig C/R at the base of each column. The signal conditioning and readout circuits Sig C/R are interconnected to provide the image output signal $V_{sig\_out}$ and the reference output signal $V_{rs\_out}$. The image output signal $V_{sig\_out}$ and the reference output signal $V_{rst\_out}$ are differentially compared to determine the intensity of light illuminating the pixel array.

The timing and control circuit provides the appropriate timing and control signals to the row decode driver and the signal conditioning and readout circuit Sig C/R during normal operation. When the test mode signal is activated to place the pixel array in the test mode, the timing and control circuit creates the appropriate timing and control signals to the test voltage select circuit to control the voltage levels V1 and V2 on the read voltage distribution line RD for each row of the pixel array.

Figure 6:
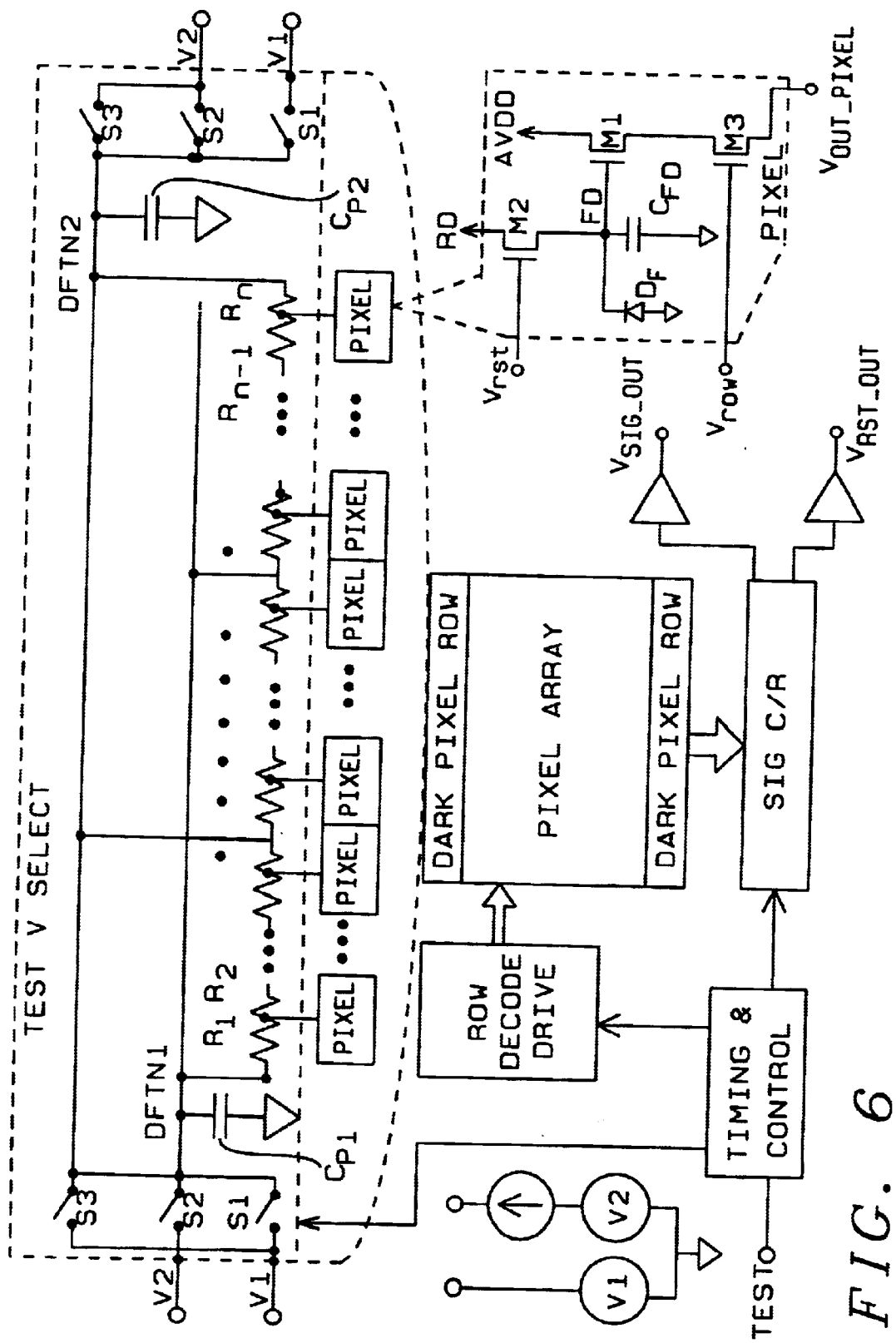
FIG. 6. is a schematic of an array of testable active pixel sensor cells employing a test signal voltage selection circuit for use in functional testing of an APS array for range and linearity of this invention.

In a second embodiment of the testable APS subsystem shown in FIG. 6, a resistor string $R_1, R_2, \ldots, R_{n-1}$, and $R_n$ is used as the voltage divider to generate different voltage levels between the voltage levels V1 and V2. The resistor string $R_1, R_2, \ldots, R_{n-1}$, and $R_n$ is connected at tap points to the reference distribution node RD of each pixel cell such that each pixel cell has a unique voltage level that is a function of the location of the tap point on the resistor string $R_1, R_2, \ldots, R_{n-1}$, and $R_n$. Therefore the voltage levels that will be fed to the pixel RD nodes are predetermined and known, provided that the two terminal voltages are known. Connecting to the resistor string $R_1, R_2, \ldots, R_{n-1}$, and $R_n$ at intervals has several advantages. One advantage is to reduce the RC time constant so each node can settle faster. In addition, the voltage step between the neighboring APS pixel cells is larger so the effect of circuit noise on signal integrity and test accuracy is reduced.

To verify the signal conditioning and readout circuit Sig C/R functionality in this test step, the voltages V1 and V2 should be set to different levels. In normal implementations of this test approach in order to satisfy design practice requirements of typical semiconductor manufacturing processes, both V1 and V2 should be less than one transistor threshold below the supply voltage to ensure that when M2 is turned on, M2 is in the linear region of operation and the voltage on RD can be driven or passed on to the FD node.

Figure 7A:
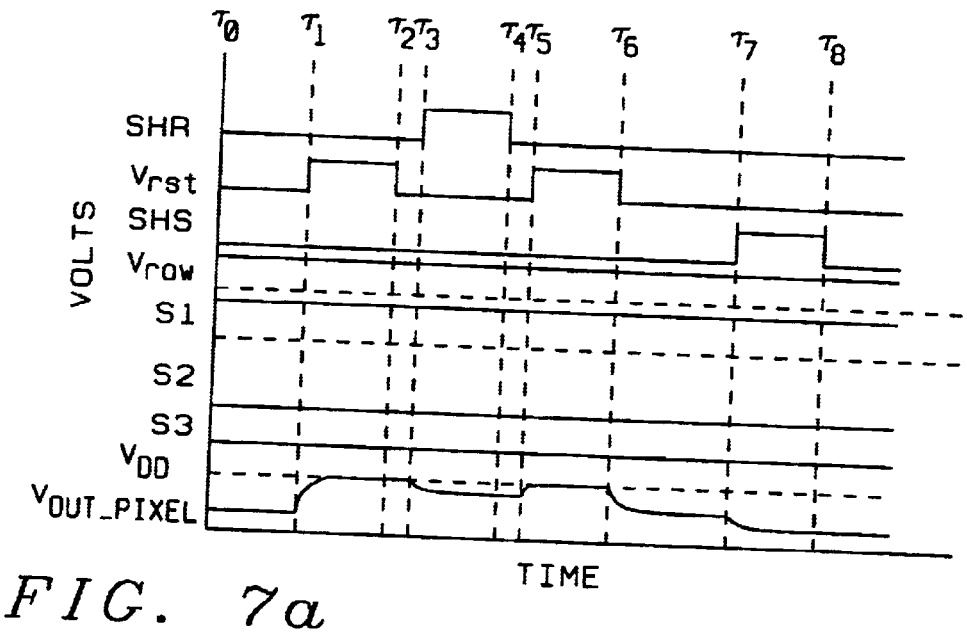
FIG. 7a. is a signal timing diagram for a method to test and verify an active pixel sensor readout chain of this invention.

The signal timing diagram of FIG. 7a illustrates timing signals created by the timing and control circuit of FIG. 6 during normal operation. At the time $t_0$, the timing and control circuit provides a signal to the row decoder driver to select a row of pixels by changing the row select signal $V_{row}$ from a low voltage level (0V) to a high voltage level ($V_{DD}$). The switch $S_1$ is activated such that the reference distribution line RD of each pixel of the selected row of pixels is set at voltage level V1. For normal operation, the voltage level V1 is set to the power supply voltage level ($V_{DD}$).

At the time $T_1$, the reset signal $V_{rst}$ changes from the low voltage level (0V) to the high voltage level ($V_{DD}$) to activate the transistor M2 and charge the capacitance $C_{FD}$ of the node FD to the voltage level V1. The voltage level V1 acts as a reference voltage level for the operation.

Since the row select signal $V_{row}$ is set to the voltage level ($V_{DD}$) and the node FD is also at the voltage level ($V_{DD}$), the transistors $M_1$ and $M_3$ are turned on and the voltage $V_{out\_pixel}$ at the output of the pixel is set to the power supply voltage level ($V_{DD}$).

At the time $t_2$, the reset signal changes from the high voltage level ($V_{DD}$) to the to the low voltage level (0V) to deactivate the transistor M2. The reference sample and hold signal SHR is changed from the low voltage level (0V) to the high voltage level ($V_{DD}$) to activate the sampling of the voltage signal present on the column bus ColBus. The sampling of the voltage on the column bus ColBus is completed at time $t_4$.

The reset signal $V_{rst}$ changes from the low voltage level (0V) to the high voltage level ($V_{DD}$) at time $t_5$ to again turn on the transistor M2 and charge the capacitance $C_{FD}$ at the node FD to the reference voltage level V1. At the time $t_6$, the reset signal changes from the high voltage level ($V_{DD}$) to the low voltage level (0V) to deactivate the transistor M2.

In the time interval $t_6$ to $t_7$, the light impinging upon the photodiode DF causes the photo-generated electrons to modify the voltage level of the node FD which is translated through the source-follower transistor M1 to the output voltage level $V_{out\_pixel}$.

At the time $t_7$, the sense sample hold signal SHS changes from a low voltage level (0V) to a high voltage level ($V_{DD}$) to activate the signal conditioning and readout circuit to acquire the voltage level indicating the level of light impinging on the pixel.

Figure 7B:
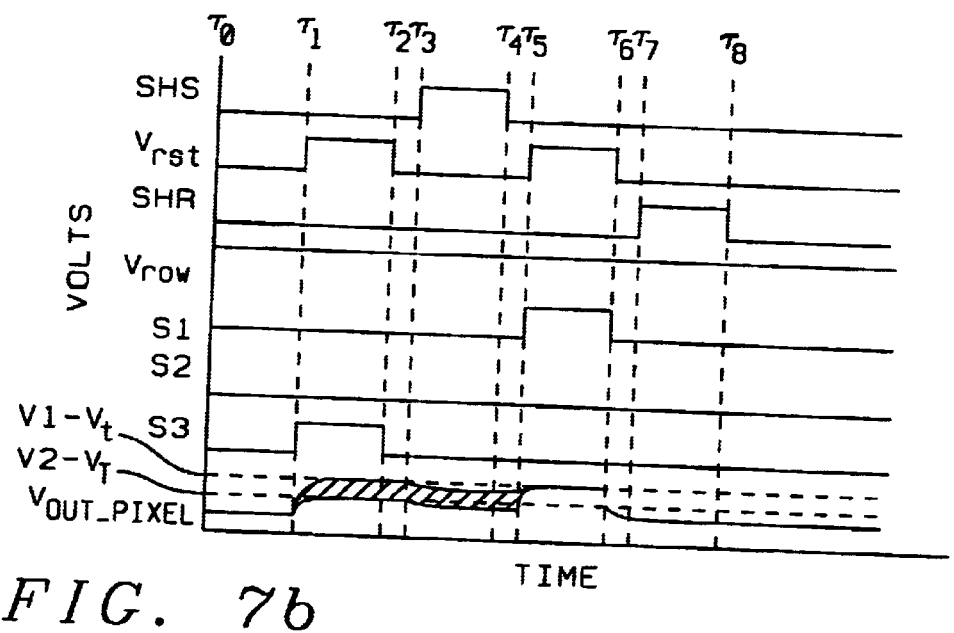
FIG. 7b. is a signal timing diagram for a method to evaluate performance an active pixel sensor readout chain of this invention.

The signal timing diagram of FIG. 7b illustrates the timing of the signals necessary to verify the functioning of the signal conditioning and readout circuit Sig C/R of FIG. 6 and evaluate the pixel signal of each pixel within a row to insure proper operation of each signal. The method of verification of functionality and evaluating proper operation begins at the time $t_0$ by changing the row select signal for the chosen row from the low voltage level (0V) to the high voltage level ($V_{DD}$) to turn on transistor $M_3$. At time $t_1$, the switch $S_3$ is activated to apply the voltage level V1 to the voltage distribution line DFTN1 and the voltage level V2 to the voltage distribution line DFTN2. Applying the voltage level V1 to the voltage distribution line DFTN1 and the voltage level V2 to the voltage distribution line DFTN$_2$ cause the resistor string $R_1, R_2, \ldots, R_{n-1}, R_n$ to act as a voltage divider. Also at the time $t_1$, the reset signal $V_{rst}$ changes from the low voltage level (0V) to the high voltage level ($V_{DD}$) to turn on the transistor M2. Thus the voltage to each pixel of the row is incrementally varied from the voltage level V1 to the voltage level V2.

Since the row select signal has turned on, the pixel output voltage $V_{out\_pixel}$ rises to a voltage level that is a voltage threshold level of the transistor M2 less than the voltage level present at the node FD.

At the time $t_2$, the switch S3 is deactivated and the reset signal $V_{rst}$ changes from the high voltage level ($V_{DD}$) to the low voltage level (0V) turning off the transistor M2. At the time $t_3$, the sense sample and hold signal SHS changes from the low voltage level (0V) to the high voltage level ($V_{DD}$) to cause the signal conditioning and readout circuit Sig C/R to sample and retain the voltage $V_{out\_pixel}$ present at the output of the pixel. At the time $t_4$, the sense sample and hold signal SHS changes from the high voltage level ($V_{DD}$) to the low voltage level (0V) to deactivate the signal conditioning and readout circuit Sig C/R.

At the time $t_5$, the switch S1 is activated to apply the voltage level V1 to the reference voltage node RD of each pixel of the selected row. Also at time $t_5$, the reset signal $V_{rst}$ changes from the low voltage level (0V) to the high voltage level ($V_{DD}$) to turn on the transistor M2 and allow the capacitance $C_{FD}$ at the node FD to charge to the voltage level V1 and thus allowing the voltage level $V_{out\_pixel}$ at the output of the pixel to reach a voltage level that is a threshold voltage $V_T$ less than the voltage level V1.

The reset signal change from the high voltage level ($V_{DD}$) to the low voltage level (0V) to deactivate the transistor M2 and the switch S1 is deactivated at the time $t_6$.

Figure 8:
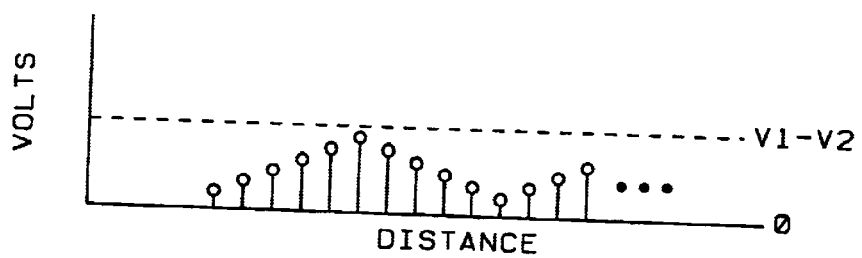
FIG. 8. is a signal timing diagram for the method of FIG. 6a to test and verify an active pixel sensor readout chain of this invention illustrating functional test results of an active pixel sensor readout as a function of physical location.

The reference sample and hold signal SHR changes from the low voltage level (0V) to the high voltage level ($V_{DD}$) at the time $t_7$ to activate the signal conditioning and readout circuit Sig C/R to sample and retain the reference voltage level. The reference sample and hold signal SHR is changed from the high voltage level ($V_{DD}$) to the low voltage level (0V) at the time $t_8$. The sensed signal output $V_{sig\_out}$ and the reference signal output $V_{rst\_out}$ are differentially compared to determine the voltage that is present at each node FD of each pixel. Since the voltage at each node FD of each pixel varies incrementally from the voltage level V2 to the voltage level V1, the output voltage of the signal conditioning and readout circuit Sig C/R will vary incrementally, dependent on the position of the connection of each to the resistor string $R_1, R_2, \ldots, R_{n-1}, R_n$. Since the values of the voltage level V1 and V2 are known, the linearity and functioning of the pixel and the intermediate circuitry can be determined. FIG. 8 shows the results of testing a row of pixels as described above. As each pixel in the row is evaluated, the voltage level is recorded according to its position on the row. As is shown, the voltage level varies incrementally between zero volts and the difference between the voltage levels V1 and V2 depending on its position in the row and its connection location to the resistor string $R_1, R_2, \ldots, R_{n-1}, R_n$.

Figure 7C:
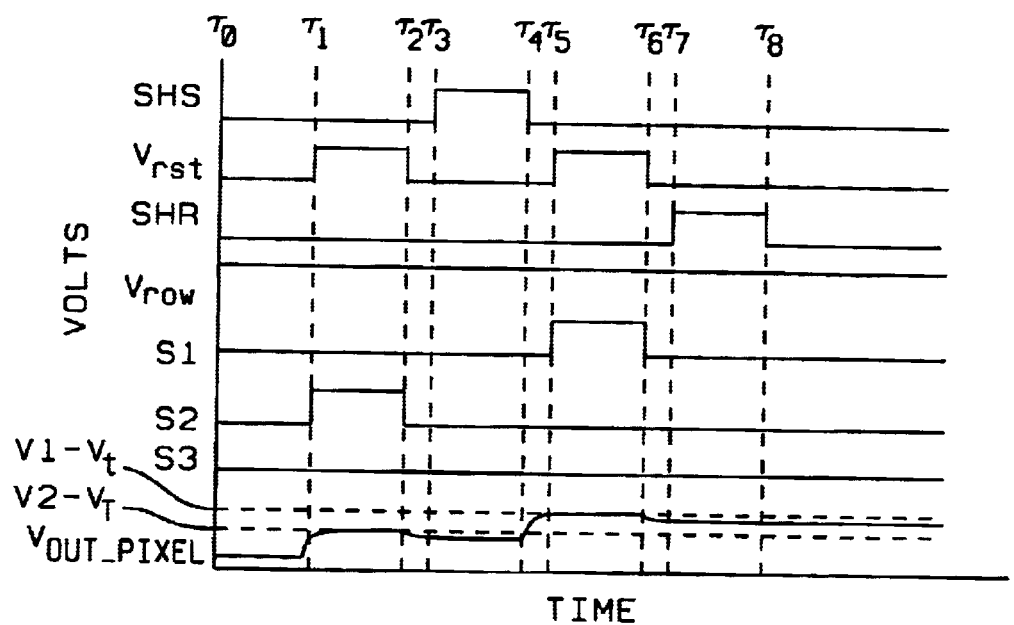
FIG. 7c. is a signal timing diagram for a method to measure the capacitance of the photo-conversion device of an active pixel sensor of this invention.

FIG. 7c illustrates the timing diagram of the testable APS array of this invention to evaluate the performance and linearity of the pixel array and the signal conditioning and readout circuit Sig C/R. At the time $t_0$, the row select signal changes from the low voltage level (0V) to the high voltage level ($V_{DD}$) to activate the transistor M3 of each pixel on the selected row. At the time $t_1$, the switch S2 is activated to place the voltage level V2 at the reference distribution node RD of each pixel of the selected row. The voltage level V2 is chosen to emulate the voltage level achieved during the exposure of the photodiode DF to impinging light. Also at the time $t_1$ the reset signal $V_{rst}$ changes from the low voltage level (0V) to the high voltage level ($V_{DD}$) to turn on the transistor M2 such that the capacitance $C_{FD}$ at the node FD is charged to the voltage level V2. The switch S2 is deactivated and the reset signal $V_{rst}$ is changed from the high voltage level ($V_{DD}$) to from the low voltage level (0V) to turn off the transistor M2.

The voltage $V_{out\_pixel}$ present at the output of the pixel is to be set to a threshold voltage $V_T$ lower than the voltage level V2. At the time $t_3$, the sense sample and hold signal SHS is activated such that the signal conditioning and readout circuit Sig C/R is activate to capture and retain the voltage level $V_{out\_pixel}$. At the time $t_4$, the sense sample and hold signal SHS changes from the high voltage level ($V_{DD}$) to from the low voltage level (0V) to deactivate the signal conditioning and readout circuit Sig C/R.

At the time $t_5$, the switch S1 is activated to place the voltage level V1 at the reference distribution node RD of each pixel of the row of the row of pixels. Also at time $t_5$, the reset signal $V_{rst}$ changes from the low voltage level (0V) to the high voltage level ($V_{DD}$) to activate the transistor M2 so as to charge the capacitance $C_{FD}$ at the node FD to the voltage level V1. The voltage level $V_{out\_pixel}$ at the output of the pixel thus rises to a voltage level that is a threshold voltage $V_T$ less than the voltage level V1. At the time $t_6$, the switch S1 is deactivated and the reset signal $V_{rst}$ changes from the high voltage level ($V_{DD}$) to the low voltage level (0V) turning off the transistor M2.

The reference sample and hold signal SHR changes from the low voltage level (0V) to the high voltage level ($V_{DD}$) at time $t_7$ to activate the signal conditioning and readout circuit Sig C/R to capture the reference voltage level at the output of the pixel $V_{out\_pixel}$. At the time $t_8$, the reference sample and hold signal SHR changes from the high voltage level ($V_{DD}$) to the low voltage level (0V) to deactivate the signal conditioning and readout circuit Sig C/R.

The reference output signal $V_{rst\_out}$ and the sense output signal $V_{sig\_out}$ are differentially compared to determine the performance of the total chain of circuitry from the pixel to the column bus ColBus to the signal conditioning and readout circuit Sig C/R. The voltage level difference between reference output signal $V_{rst\_out}$ and the sense output signal $V_{sig\_out}$ represents the magnitude of the voltage difference between the voltage level V1 and the voltage level V2. The voltage level differences of the reference output signal $V_{rst\_out}$ and the sense output signal $V_{sig\_out}$ for each pixel on the selected row of pixels are recorded, and operational parameters such as linearity and range for each testable APS cell of the selected row of pixels, each column bus ColBus and signal conditioning and readout circuit Sig C/R are extracted from the recorded voltage level differences.

Figure 7D:
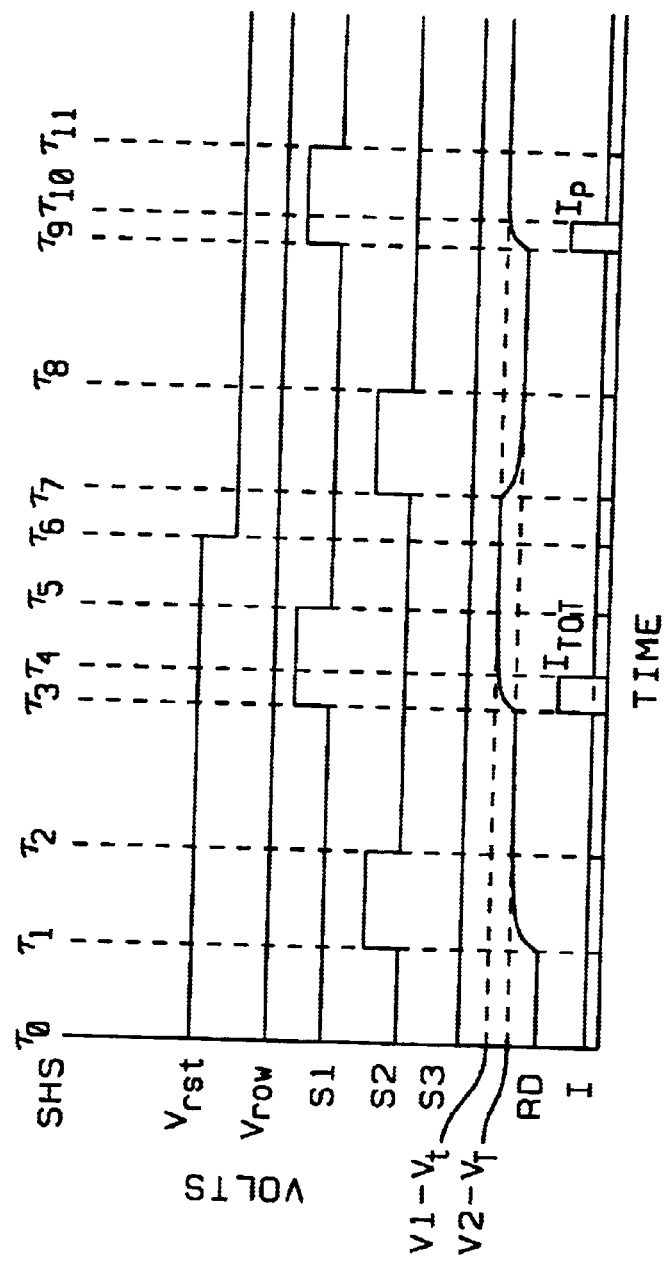
FIG. 7d. is a signal timing diagram for a method to measure the the total capacitance for all the pixels on the selected row of the photo-conversion device of an active pixel sensor of this invention.

The testable APS cell coupled to the test voltage select circuit TestVSelect of FIG. 6 is used to measure the total capacitance $C_{FD}$ of the row of pixels. Referring to FIG. 6, the voltage sources $V_S1$ and $V_S2$ provide the voltage levels V1 and V2 to the test voltage select circuit. In series with the voltage source $V_S1$ is a current measuring device X1 to determine the current I flowing from the voltage source $V_S1$ to the test voltage select circuit. Refer to FIG. 7d for the description of the method to measure the total capacitance $C_{FD}$ for all the pixels on the selected row. The row select signal is held at the low voltage level (0V) to keep the transistor M2 turned off. At the time $t_0$, the reset signal $V_{rst}$ changes from the low voltage level (V0) to the high voltage level ($V_{DD}$) to activate the transistor M2 of each APS pixel cell. At the time $t_1$, the switch S2 is activated to place the voltage level V2 at the reference distribution node RD of each pixel on the row of pixels. Once all the capacitances $C_{FD}$ at the node FD of each pixel is charged to the voltage level V2, the switch S2 is deactivated at the time $t_2$. The switch S1 is activated at the time $t_3$ to place the voltage level V1 at the reference distribution node RD of each pixel. As the capacitance $C_{FD}$ of all the pixels on the selected row are charged, the current I is recorded by the current measurement device X1 of FIG. 6. When all the capacitances $C_{FD}$ of the node FD of all the pixels have charged to the voltage level V1, the switch S1 is deactivated at the time $t_5$.

The total capacitance charged is the parasitic capacitance of the test voltage select circuit and the capacitance $C_{FD}$ of the node FD of all the pixels as shown by the equation:

$$C_T = C_P + \sum_1^n C_{FD}$$

where
$C_T$ is the total capacitance of the test voltage select circuit and the capacitance of the node FD.
$C_P$ is the parasitic capacitance of the test voltage select circuit.
$C_{FD}$ is the capacitance of the node FD of a pixel.
n is the number of pixels on the selected row.

It is well-known in the art that the total capacitance is determined by the equation:

$$C_T = \frac{I_T}{\frac{dV}{dt}}$$

where:
I is the current measured by the current measuring device X1 of FIG. 6.
dv is the difference between the voltage level V1 and the voltage level V2.
dt is the period required for the capacitance to charge or the time elapsed from the time $t_3$ to $t_4$.

If the transistor M2 of all the pixels on a selected row of pixels is turned off and the previous method of setting the voltage at the reference distribution node RD of each pixel to the voltage level V2, then to the voltage level V1, and then observing the charging current I is followed, the parasitic capacitance $C_P$ of the test voltage select circuit can then be determined. To accomplish this, the reset signal $V_{rst}$ is changed from the high voltage level ($V_{DD}$) to the low voltage level (0V) at the time $t_6$ to deactivate the transistor M2 of all the pixels of the selected row of pixels. At the time $t_7$, the switch S2 is activated to place the voltage level V2 at the reference distribution node RD of all of the pixels. When the parasitic capacitance $C_P$ of the test voltage select circuit is charged to the voltage level V2, the switch S2 is deactivated at the time $t_8$. At the time $t_9$, the switch S1 is activated to charge the parasitic capacitance $C_P$ of the test voltage select circuit from the voltage level V2 to the voltage level V1. The current I from the voltage source $V_S1$ is measured by the current measurement device X1. When the reference distribution node RD of all of the pixels on the selected row are charged to the voltage level V1, the switch S1 is deactivated.

The parasitic capacitance $C_P$ is determined by the equation:

$$C_P = \frac{I_P}{\frac{dV}{dt}}$$

where:
$I_P$ is the current measured by the current measuring device X1 of FIG. 6.

dv is the difference between the voltage level V1 and the voltage level V2.

dt is the period required for the capacitance to charge or the time elapsed from the time $t_9$ to $t_{10}$.

The total capacitance $C_{FD\_TOT}$ of the nodes FD of all the pixels then is determined by the equation:

$$C_{FD\_TOT} = C_T - C_P$$

The average node capacitance $\overline{C_{FD}}$ of the nodes FD of all the pixels then is determined by the equation:

$$\overline{C_{FD}} = \frac{C_T - C_P}{n}$$

The testable APS cell of this invention, as described above, is configured as an array of testable APS cells. A row of the testable APS cells can be placed at the edge of an array of APS cells of the prior art. The row of testable APS cells are placed at the edge of the array opposite the signal conditioning and readout circuit Sig C/R.

Further, the peripheral rows of APS cells are marked to prevent light from impinging on the photodiodes $D_F$ of the APS cell. These are commonly referred to as "dark" pixels.

Since no external light source is needed to verify the functionality of the testable APS and associated readout circuit of this invention, there is no need for optical setup during this particular testing phase of the testable APS pixel circuits. An advantage of the part of the present invention's test steps is that it can be used to pre-screen the APS sensor chips, and, when found by these test steps, to reject the chips with defective APS cell and readout circuitry before they undergo the final optical test. In addition, a row of selected testable APS pixel cells can be placed as part of the "dark" pixels surrounding the active pixel array, typically as the top-most or bottom-most row, since the resistor string needs to be close by. Another advantage of this invention is that, in this approach of this embodiment of the invention, the array regularity needed for layout and routing chip physical design and area efficiency is preserved since the additional routing is outside of the pixel array.

In summary, one advantage of this invention is that the photosensitive element and parasitic capacitance test measurement can be done in a dark environment. This allows the testable APS cells required for test and measurement of APS imaging products to be part of the "dark" pixels used to measure and project reliability and functional quality of an overall sensor chip. A further advantage is that the DFT structure of this invention enables the measurement and verification of the testable APS pixel readout circuit functionality without the need to use a dedicated optical sensor and associated design and test circuitry.

Figure 9A:
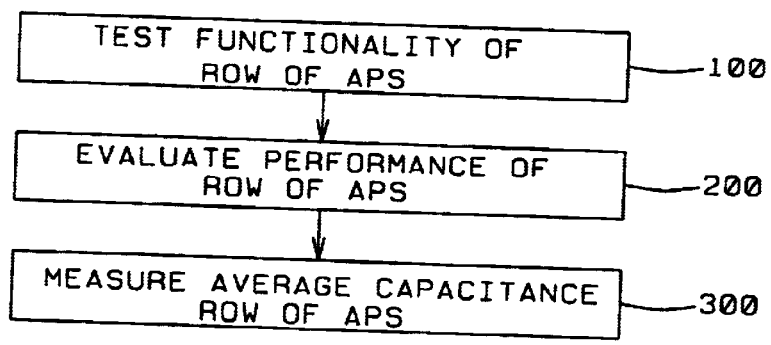
FIG. 9a. is a flow diagram for a method validate functioning of an active pixel sensor readout chain of this invention.

Refer now to FIGS. 9a–9d to discuss the method to verify performance of a row of active pixel sensors. The steps of the method as shown in FIG. 9a are to test the functionality 100 of each APS on the selected row of APS's and the chain of circuitry connected to the APS's on the row of APS's. The chain of circuitry tested is the column bus connected to each APS of a column of APS's of FIG. 4 and the signal conditioning and readout circuit Sig C/R of FIG. 4. The next step of the method of this invention evaluates the performance 200 of each APS of the selected row of APS's and the chain of circuitry connected to each APS. The evaluation of the performance determines the range and linearity of the APS and the connected chain of circuitry to insure the accurate determination of the light impinging on the APS's.

The next step of the method of this invention is the determination of an average capacitance per APS for a row of APS's.

The sequential order of the steps of the method of this invention is not unique. The steps may be performed in any order. Further, the method for verifying performance may include only one of the steps as listed or any combination of the steps as shown.

Figure 9B:
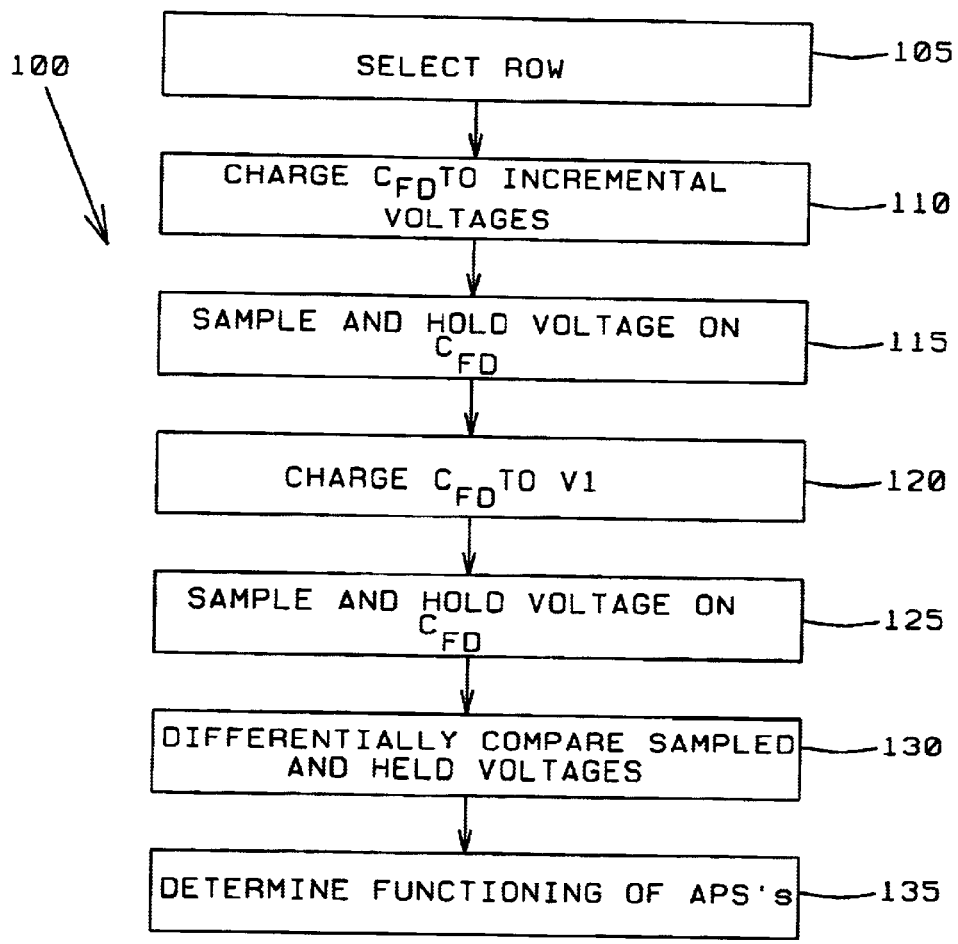
FIG. 9b. is a flow diagram for a method to test and verify an active pixel sensor readout chain of this invention.

Refer now to FIG. 9b for a discussion of the testing of the functionality 100 of a row of APS's and the chain of circuitry connected to each APS. The row of APS's whose functionality is to be tested are selected 105. In FIG. 4 the row select signal $V_{row}$ is activated to connect each APS on the row to the column bus and through the column bus to the signal conditioning and readout circuit SIG C/R. The capacitance $C_{FD}$ of the photodiode $D_F$ of each APS of a selected row of APS's of FIG. 6 is charged 110 to one of a group of incremental voltages. These incremental voltages vary from the voltage level V2 to the voltage level V1 as above-described and are formed by the voltage divider created by the resistor string $R_1, R_2, \ldots, R_{n-1}, R_n$ of FIG. 6.

To charge the capacitance $C_{FD}$ to the incremental voltage level, the switch S3 is activated to place the first voltage distribution line DFTN1 and the second voltage level V2 on the second voltage distribution line DFTN2. The voltage divider formed by the resistor string $R_1, R_2, \ldots, R_{n-1}, R_n$ then forms the incremental voltages. At the time the switch S3 is activated, the reset signal $V_{rst}$ turns on the transistor M2 to allow the capacitance $C_{FD}$ to charge to the incremental voltage level present at the reference distribution node RD.

The incremental voltage present on the capacitance $C_{FD}$ is buffered by the source follower formed by the transistor M1 such that the output signal $V_{out\_pixel}$ at the output of the APS is approximately a threshold voltage $V_T$ lower than the incremental voltage present at the capacitance $C_{FD}$.

The voltage $V_{out\_pixel}$ at the output of the APS representing the magnitude of the voltage that has charged the capacitance $C_{FD}$ is sampled and held 115 by the signal conditioning and readout circuit SIG C/R.

The capacitance $C_{FD}$ of the photodiode $D_{FD}$ of each APS of the row of selected APS's is now charged 120 to the voltage level V1. To accomplish this, the switch S1 of FIG. 6 is activated to place the first voltage level V1 on the voltage distribution lines DFTN1 and DFTN2, and thus to the reference distribution node RD. At this same time, the reset signal $V_{rst}$ turns on the transistor M2 to charge the capacitance $C_{FD}$ to the voltage level V1.

The voltage level V1 present on the capacitance $C_{FD}$ is buffered by the source follower formed by the transistor M1 such that the output signal $V_{out\_pixel}$ at the output of the APS is approximately a threshold voltage level $V_T$ lower than the voltage level V1 present at the capacitance $C_{FD}$.

The voltage $V_{out\_pixel}$ at the output of the APS representing the magnitude of the voltage that has charged the capacitance $C_{FD}$ is sampled and held 125 by the signal conditioning and readout circuit SIG C/R.

The sampled and held incremental voltage and the sampled and held voltage level V1 are differentially compared 130 to form a difference signal. The magnitude of the difference signals of the APS's on the selected row of APS's are compared to determine 135 that all the APS's of the selected row of APS's are functioning and the chain of circuitry connected to each APS is also functioning.

Figure 9C:
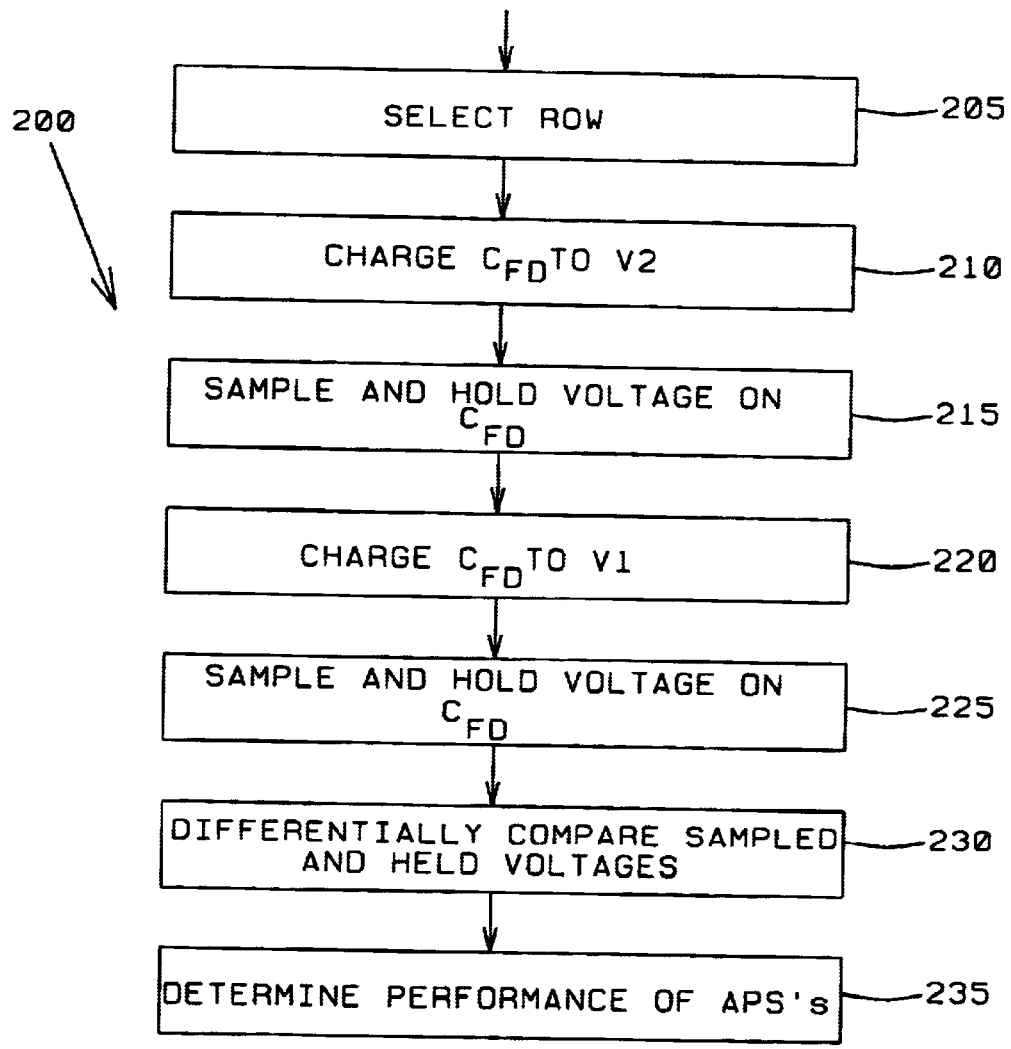
FIG. 9c. is a flow diagram for a method to evaluate performance an active pixel sensor readout chain of this invention.
Figure 9D:
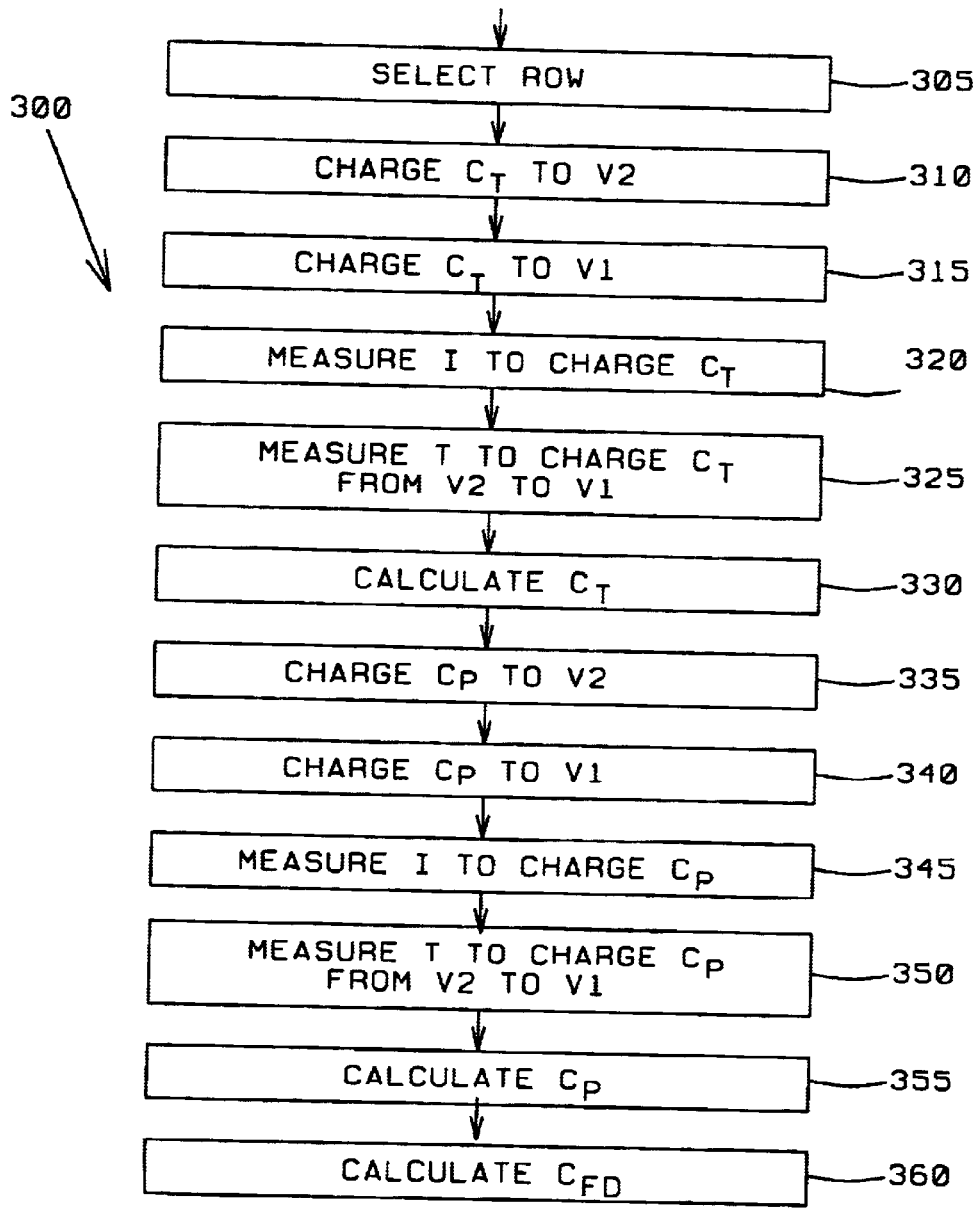
FIG. 9d. is a flow for a method to measure the capacitance of the photo-conversion device of an active pixel sensor of this invention.

Refer now to FIG. 9c for a discussion of evaluating performance 200 of a row of APS's and the chain of circuitry connected to each APS. The row of APS's whose functionality is to be tested are selected 205. In FIG. 4 the row select signal $V_{row}$ is activated to connect each APS on the row to the column bus and through the column bus to the signal conditioning and readout circuit SIG C/R. The capacitance $C_{FD}$ of the photodiode $D_{FD}$ of each APS of a selected row of APS's of FIG. 6 is charged 210 to the voltage level V2.

To charge the capacitance $C_{FD}$ to the voltage level V2, the switch S3 is activated to place the voltage level V2 on the first and second voltage distribution lines DFTN1 and DFTN2. At the time the switch S3 is activated, the reset signal $V_{rst}$ turns on the transistor M2 to allow the capacitance $C_{FD}$ to charge to the voltage level V2 present at the reference distribution node RD.

The voltage level V2 present on the capacitance $C_{FD}$ is buffered by the source follower formed by the transistor M1 such that the output signal $V_{out\_pixel}$ at the output of the APS is approximately a threshold voltage $V_T$ lower than the voltage level V2 present at the capacitance $C_{FD}$.

The voltage $V_{out\_pixel}$ at the output of the APS representing the magnitude of the voltage that has charged the capacitance $C_{FD}$ is sampled and held 215 by the signal conditioning and readout circuit SIG C/R.

The capacitance $C_{FD}$ of the photodiode $D_{FD}$ of each APS of the row of selected APS's is now charged 220 to the voltage level V1. To accomplish this, the switch S1 of FIG. 6 is activated to place the first voltage level V1 on the voltage distribution lines DFTN1 and DFTN2, and thus to the reference distribution node RD. At this same time, the reset signal $V_{rst}$ turns on the transistor M2 to charge the capacitance $C_{FD}$ to the voltage level V1.

The voltage level V1 present on the capacitance $C_{FD}$ is buffered by the source follower formed by the transistor M1 such that the output signal $V_{out\_pixel}$ at the output of the APS is approximately a threshold voltage level $V_T$ lower than the voltage level V1 present at the capacitance $C_{FD}$.

The voltage $V_{out\_pixel}$ at the output of the APS representing the magnitude of the voltage that has charged the capacitance $C_{FD}$ is sampled and held 225 by the signal conditioning and readout circuit SIG C/R.

The sampled and held voltage level V2 and the sampled and held voltage level V1 are differentially compared 230 to form a difference signal. The magnitude of the difference signals of the APS's on the selected row of APS's are compared to determine 235 the performance of each of the APS's of the selected row of APS's and the chain of circuitry connected to each APS. By evaluating the difference voltages, the linearity of the APS's and the attached chain of circuitry is determined.

From the measure of the linearity of the APS's of an array of APS's, the intensity of the light impinging upon the array of APS's can be more accurately determined.

The method for determining 300 an average capacitance $C_{FD}$ per APS of the row of APS's within the array of APS's is first selected 305. In this case, the row select signal $V_{row}$ may or may not be activated to turn on the transistor M3 of FIG. 4.

The total capacitance $C_T$ is defined as the capacitance $C_{FD}$ of the photodiodes $D_{FD}$ of all of the APS's on the selected row and the parasitic capacitances $C_{P1}$ and $CP_2$ (referred to hereinafter in total as $C_T$ of the test voltage select circuit of FIG. 6. The total capacitance $C_T$ is charged 310 to the voltage level V2. The switch S2 of the test voltage select circuit of FIG. 6 is activated to apply the voltage level V2 to the first and second voltage distribution lines DFTN1 and DFTN2, and thus to the reference distribution nodes RD of all of the APS's on the selected row. The parasitic capacitance $C_T$ is now charged to the voltage level V2. The voltage reset signal $V_{rst}$ is simultaneously activated to turn on the transistor M2 to couple the voltage level V2 to the capacitance $C_{FD}$ of the photodiode $D_{FD}$. The switch S2 and the reset signal $V_{rst}$ are deactivated at the completion of the charging 310 of the total capacitance $C_T$ to the voltage level V2.

Next, the total capacitance $C_T$ is charged 315 from the voltage level V2 to the voltage level V1. The switch S1 is activated to apply the voltage level V1 to the first and second voltage distribution lines DFTN1 and DFTN2, and thus to the reference distribution nodes RD of all of the APS's on the selected row. The parasitic capacitance $C_P$ is now charged to the voltage level V1. The reset signal $V_{rst}$ is simultaneously activated to turn on the transistor M2 to couple the voltage level V1 to charge the capacitance $C_{FD}$ of the photodiode $D_{FD}$ to the voltage level V1.

While the total capacitance $C_T$ is being charged, the current determining device $X_1$ measures 320 the current $I_T$ flowing to the total capacitance $C_T$. Further, the charging period $t_{CT}$ to charge the total capacitance $C_T$ is measured 325.

The total capacitance $C_T$ is calculated 330 by the formula:

$$C_T = \frac{I_T}{\frac{dV}{dt_{CT}}}$$

where $C_T$ is the total capacitance, $I_T$ is the current flowing to the total capacitance, $C_T$ during charging from the voltage level V2 to the voltage level V1, dv is the difference between the voltage level V1 and the voltage level V2, and $dt_{CT}$ is the charging period of the total capacitance $C_T$.

The parasitic capacitance $C_P$ is charged 335 to the voltage level V2. The switch S2 of the test voltage select circuit of FIG. 6 is activated to apply the voltage level V2 to the first and second voltage distribution lines DFTN1 and DFTN2, and thus to the reference distribution nodes RD of all of the APS's on the selected row. The parasitic capacitance $C_P$ is now charged to the voltage level V2. The voltage reset signal $V_{rst}$ is not activated to turn on the transistor M2 to couple the voltage level V2 to the capacitance $C_{FD}$ of the photodiode $D_{FD}$. The switch S2 is deactivated at the completion of the charging 335 of the parasitic capacitance $C_P$ to the voltage level V2.

Next, the parasitic capacitance $C_P$ is charged 340 from the voltage level V2 to the voltage level V1. The switch S1 is activated to apply the voltage level V1 to the first and second voltage distribution lines DFTN1 and DFTN2, and thus to the reference distribution nodes RD of all of the APS's on the selected row. The parasitic capacitance $C_P$ is now charged to the voltage level V1.

The reset signal $V_{rst}$ again is not activated to turn on the transistor M2 and the voltage level V1 is not coupled to the capacitance $C_{FD}$ of the photodiode $D_{FD}$ to the voltage level V1.

While the parasitic capacitance $C_P$ is being charged, the current determining device $X_1$ is measuring 345 the current $I_P$ flowing to the parasitic capacitance $C_P$. Further, the charging period $t_{CP}$ to charge the parasitic capacitance $C_P$ is measured 350.

The parasitic capacitance $C_P$ is calculated 355 by the formula:

$$C_P = \frac{I_P}{\frac{dV}{dt_{CP}}}$$

where $C_P$ is the parasitic capacitance, $I_P$ is the current flowing to the parasitic capacitance $C_P$ during charging from the voltage level V2 to the voltage level V1, dv is the difference between the voltage level V1 and the voltage level V2, and $dt_{CP}$ is the charging period of the total capacitance $C_P$.

The average capacitance $\overline{C_{FD}}$ of the photodiode of the selected row of APS's is calculated 360 by the formula:

$$\overline{C_{FD}} = \frac{C_T - C_P}{n}$$

where $\overline{C_{FD}}$ is the average capacitance of the photodiode, $C_T$ Is the total capacitance, $C_P$ is the parasitic capacitance, and n is the number of APS's in the selected row of APS's.

The method as described in FIG. 9a generally selects a row for verifying performance of the APS's. It is in keeping with the intent of this invention that any convenient grouping of APS's can be selected for verifying performance. Further, it is apparent to those skilled in the art that the grouping of APS's may contain any number of APS's. An individual APS may be selected to verify performance.

While this invention has been particularly shown and described with reference to the preferred embodiments thereof, it will be understood by those skilled in the art that various changes in form and details may be made without departing from the spirit and scope of the invention. Reversing the polarities of the silicon materials implanted in a integrated circuit implementation of the DFT APS can easily form a corresponding active pixel sensor circuit with the roles of P-type and N-type CMOS devices reversed. The operational voltage biases and the signal levels shown in each of the figures will also be reversed appropriately.

The invention claimed is:

1. A method for verifying operation of a group of at least one active pixel sensor within an array of active pixel sensors and of a chain of circuitry connected to each active pixel sensor for capturing an output signal from said active pixel sensor, whereby said chain of circuitry includes a column bus circuit and a signal conditioning and readout circuit, and whereby said method comprises the step of:

testing functionality of said group of active pixel sensors and the chain of circuitry connected to each active pixel sensor of the group of active pixel sensors by the steps of:

activating said group of active pixel sensors, applying one of a group of voltage levels that vary incrementally from a first voltage level to charge a capacitance of a photo-conversion device of each active pixel sensor of the group of active pixel sensors to a first charging voltage level and sampling and holding said first charging voltage level from the capacitance of the photo-conversion device of each active pixel sensor of the group of active pixel sensors, applying the first voltage level to charge the capacitance of the photo conversion device of each active pixel sensor of the group of active pixel sensors to a second charging voltage level, sampling and holding a second charging voltage level from said capacitance of the photo-conversion device of each active pixel sensor of the group of active pixel sensors, differentially comparing the first charging voltage level with the second charging voltage level to create a first difference voltage, whereby said first difference voltage indicates the functionality of each active pixel sensor of the group of active pixel sensors and the chain of circuitry connected to said active pixel sensor.

\* \* \* \* \*